United States Patent [19]
Tippmann

[11] Patent Number: 5,727,453
[45] Date of Patent: Mar. 17, 1998

[54] APPARATUS AND METHOD FOR THAWING FROZEN FOOD PRODUCT

[75] Inventor: Robert Tippmann, Palm Bay, Fla.

[73] Assignee: HJC Beverages, Inc., Fort Lauderdale, Fla.

[21] Appl. No.: 228,656

[22] Filed: Apr. 18, 1994

[51] Int. Cl.⁶ .................. F25B 29/00; F28F 3/08
[52] U.S. Cl. .................. 99/483; 426/524; 426/389; 126/343.5 R; 126/343.5 A; 62/238.6; 62/352; 62/278; 62/81
[58] Field of Search .................. 126/369, 343.5 A, 126/343.5 R; 165/104.21; 62/238.6, 81, 352; 99/483; 426/524, 389

[56] References Cited

U.S. PATENT DOCUMENTS

| | | | |
|---|---|---|---|
| 3,516,398 | 6/1970 | Hirahara | 126/343.5 R |
| 3,561,426 | 2/1971 | Wheeler | 126/343.5 R |
| 4,370,865 | 2/1983 | Hibino et al. | 62/347 |
| 4,660,542 | 4/1987 | Scherer | 126/369 |
| 4,733,650 | 3/1988 | Triggs | 126/343.5 A |
| 4,813,239 | 3/1989 | Olson | 62/278 |

*Primary Examiner*—John K. Ford
*Attorney, Agent, or Firm*—Malin, Haley, DiMaggio & Crosby, P.A.

[57] ABSTRACT

A new method and apparatus for thawing frozen food product utilizing desuperheated gas thawing medium near its saturation point. The transfer of the latent heat of condensation from the thawing medium to the frozen food product immediately condenses the thawing medium into a condensate liquid, after which it is recycled back through the refrigeration system. Since the thawing medium quickly condenses upon giving up energy to the frozen food product, it falls away from the upper surface of the thawing deck tube interiors, being replaced by additional gaseous thawing medium near its saturation point, which in turn condenses upon giving up heat, and the process continues until the food product is completely thawed. Since the state of the thawing medium is consistent throughout the thawing deck tubes, the temperature along the length of each of the tubes is uniform.

12 Claims, 7 Drawing Sheets

APPARATUS AND METHOD FOR THAWING FROZEN FOOD PRODUCT

BACKGROUND OF THE INVENTION

1. Field of the Invention

The present invention relates generally to an apparatus for thawing frozen food product, and more particularly relates to an apparatus having a thawing deck which supports and uniformly melts blocks of frozen food product by the transfer of heat from desuperheated vapor within the thawing deck at a rate that maintains the food product at a desirably low temperature.

2. Description of the Background Art

Food products, such as orange juice, are typically frozen into blocks and placed in refrigerated storage for use at some later date. Before packaging, the frozen blocks must be melted. Thawing is typically accomplished by supporting the frozen blocks on hollow tubes and running warm water, or some other thawing fluid, through the tubes so that heat transfer occurs from the thawing fluid to the blocks. However, running a warm thawing fluid in one end of the tube and out the other end produces an uneven temperature in the tubes because the thawing fluid is warmer at the entry point compared to the exit point due to heat transfer to the frozen food product. As a result, one side of the block thaws faster than the other causing the block to tilt and slide from the tubes as it melts. Consequently, there exists a need for a thawing apparatus for melting frozen food products in an even and efficient manner.

A variety of heating systems are disclosed in the background art for melting various substances. However none address the problems as advantageously as the present invention. For instance, Wheeler, U.S. Pat. No. 3,561,426, discloses an apparatus for melting finely granulated frozen liquids ("fines") such as coffee extract. The fines melter comprises a bank of heating tubes, each connected on one side to an inlet header pipe and on the other side to an outlet manifold, a means for directing fine extracts onto the bank of tubes, and a hood which receives extract fines in a melting section above a catch tank which receives the melted fines. The granulated extract is passed through two levels of wire mesh screen before it is directed into the fines melter where warm water is supplied through the tubes for melting fines deposited thereon. Hibino, U.S. Pat. No. 4,370,865, discloses an ice making and fresh water dispensing apparatus comprising an ice making unit for making pure ice, an electric heater for melting the ice into fresh water, a tank for storing fresh water resulting from the melting, a sensor for sensing the water temperature prevailing in the tank, and a control system responsive to the sensor for actuating a heater to maintain the water temperature at some predetermined value. Triggs, U.S. Pat. No. 4,733,650, discloses a fat and oil collection system having an open ended container suspended upon a hollow rod, the hollow rod for receiving steam or compressed air to force the solid fats from the container. By way of contrast, the present invention provides an apparatus for thawing frozen food product by filling thawing tubes with heated gas so that the tubes are maintained at a constant temperature throughout their lengths for evenly melting the frozen food product. The above noted background art neither solves nor addresses the problems contemplated by the present invention. Therefore, there remains a need for a device which solves the problems present in thawing frozen food product. The present invention solves these problems by providing an apparatus which evenly and efficiently thaws frozen blocks of product safely, efficiently and uniformly.

The common practice for melting frozen citrus juices today consists of, first, partially warming the frozen juice with concentrated steam while the juice is in its container to facilitate removing the frozen juice from the container (e.g. barrel), second crushing or shredding the remaining frozen juice product, and third spraying warm juice (e.g. 70° F.) over the shredded juice. The foregoing processes is undesirable because it is very expensive to make the quantity of steam required and to run and maintain the shredding mechanisms. Further the shredding operation breaks up the pulp sacks into juice, such that a substantial amount of pulp matter is lost.

It is desirable therefore, to provide a thawing apparatus for frozen food product which does not rely upon moving parts and which can be operated off of the waste heat from a preexisting refrigeration system.

SUMMARY OF THE INVENTION

It is an object of the present invention to provide an apparatus for quickly thawing frozen food product uniformly and without spoiling the product as it thaws.

It is another object of the invention to provide an apparatus for thawing frozen food product by indirect heat transfer with a gas so that an even temperature may be maintained throughout the portion of the apparatus which contacts the food product being thawed.

It is a further object of the invention to provide an apparatus for thawing frozen food product in and environmentally safe, closed loop system.

In accordance with these and other objects, the present invention is comprised of a source of saturated gas, which may be derived, for example, from waste heat from any of the known refrigeration systems, a gas desuperheater (if the waste gas is superheated), at least one thawing deck, having a gas header and a condensate liquid collecting header, and at least one thawed food collection container.

By "desuperheater" is meant any apparatus or collection of apparatus which converts a superheated gas to desuperheated gas near its saturation point ("saturated gas"). Such apparatus may be, for example but not by way of limitation, a tank in which the superheated gas is bubbled through a liquid, where the desuperheated gas emerges above the liquid. An object of the instant invention is to thaw frozen liquid food product at a controlled temperature and rate that preserves the food and prevents premature spoiling. For instance, when thawing frozen citrus juice, it is important to maintain the melted juice at no higher than approximately 40° fahrenheit to prevent bacteriological development. To meet the objectives of the invention, a superheated gas ("thawing medium") is desuperheated to near its saturation point. The gas is directed into hollow tubes which make up a thawing deck so that heat within the desuperheated gas is transferred into the frozen food product resting on the deck. The thawing medium may be ammonia, freon, water vapor, carbon dioxide, sulphur dioxide, propane, or any other substance which can be caused to change state after being introduced within the hollow tubes of the thawing deck from a desuperheated gas to a liquid. When waste heat from a refrigeration system is used to provide heat for the invention, the gas is ordinarily heated to temperatures ranging between 100° and 212° fahrenheit depending on the gas. However, any known heat source may be used, which may result in the gas being delivered at temperatures other than 100°–212° F. By utilizing gas at its saturation point, a desirable temperature balance is achieved so that the frozen food product is protected from overheating that could cause the food to spoil. Since the gas is saturated, as heat transfers from the gas to the thawing deck and thence to the frozen block, the gas virtually immediately condenses into its liquid form. This liquid falls to the bottom of the thawing deck tubes, draining into a condensate liquid-collecting header, through a condensate return conduit, and is recycled.

The thawing deck comprises a plurality of elongated tubes, preferably horizontally disposed in closely spaced relation that leaves enough room for the melted food product to fall into the thawed food product container.

In one embodiment, where a superheated thawing medium is supplied to the system, the invention utilizes a desuperheating tank which is supplied with a superheated thawing medium in a gas state through a gas supply conduit. The desuperheating tank also contains a liquid, which may be the thawing medium in its condensed (liquid) form. The superheated gas is desuperheated to its saturation point and directed into the thawing deck tubes. Thus, the desuperheating tank brings the thawing medium to its saturation point prior to passing into thawing deck tubes. The gas supply conduit fluidly communicates the interior of the desuperheating tank with the thawing deck to direct the thawing medium from the tank into the thawing deck.

In another embodiment, the desuperheating tank is an indirect shell and tube heat exchanger having a shell volume and a plurality of tubes disposed within the shell. A vapor-collecting chamber, or liquid/vapor phase separator, may be fluidly connected to the shell volume. The shell volume contains a liquid such as thawing medium in its liquid form, which is heated by any conventional heating medium in the tubes to boiling, producing a vapor which is directed through vapor supply lines connecting the shell volume to the phase separator. Since the phase separator allows a temporary reduction in velocity, any liquid in the vapor drops out due to gravity and flows back into the shell volume. The diameter of the supply lines is large enough to keep the pressure drop in the vapor at such a level so that gas does not condense (e.g. 1 lb. per inch or less of pressure drop per 100 ft. of pipe). Thus, the phase separator separates the vapor from any residual liquid left in the vapor so that only thawing medium in its gaseous state, near its saturation point, is directed to the thawing decks. The tubes of the shell and tube heat exchanger may include, for example, electric coils, superheated gas, or any source of heat capable of heating the inside of the tubes, preferably some source of waste energy such as wash down water or ambient air, for heating the thawing medium to such a degree that evaporation of a portion of the thawing medium occurs.

Accordingly, the present invention comprises a new method and apparatus for thawing frozen food product utilizing desuperheated gas thawing medium near its saturation point. The transfer of heat from the thawing medium to the frozen food product immediately condenses the thawing medium into a condensate liquid, after which it is recycled through a condensate return conduit back through the refrigeration system. Since the thawing medium quickly condenses upon giving up energy to the frozen food product, it falls away from the upper surfaces of the interiors of the thawing deck tubes, being replaced by additional gaseous thawing medium near its saturation point, which in turn condenses upon giving up heat, and the process continues until the food product is completely thawed. Since the state of the thawing medium is consistent throughout the thawing deck tubes, the temperature along the length of each of the tube is uniform.

In accordance with these and other objects which will become apparent hereinafter, the instant invention will now be described with particular reference to the accompanying drawings.

BRIEF DESCRIPTION OF THE DRAWINGS

FIG. 2 is a cross sectional elevational view of the first embodiment of the invention, taken along lines 2—2 of FIG. 1a.

FIG. 3 is a cross sectional elevational view of the first embodiment of the invention, taken along lines 3—3 of FIG. 1a.

FIG. 4a is a cross sectional elevational view of the first embodiment of the invention, taken along lines 4a—4a of FIG. 1a.

DESCRIPTION OF THE PREFERRED EMBODIMENTS

With reference to the drawings, FIGS. 1–8 illustrate several embodiments of the apparatus for thawing frozen food product. A first embodiment of the invention is shown in FIGS. 1a, 2, 3 and 4a, comprising a closed loop system generally comprising a desuperheated gas supply system 20; at least one thawing deck 40 having a gas header 42, a condensate header 44, and a plurality of thawing tubes 46; a gas supply line 32; a condensate return conduit 34; and at least one thawed food collection container 60. The desuperheated gas supply system 20 includes (where superheated gas is initially provided) a desuperheating tank 22 which is partially filled with a liquid. The system 20 operates as a heat exchanger, either direct or indirect, whereby heat transfers from the superheated gas into the liquid 25, raising the temperature of the liquid 25 and lowering the energy of the gas such that a gas near its saturation point results. Where a direct heat exchanger is used in the desuperheating system, the superheated gas and liquid condensate are the same media. Where an indirect heat exchanger is used, the gas and liquid condensate are separated and may or may not be the same media, but heat is transferred nonetheless. In either case, thawing medium near its saturation point is continually produced in the tank 22 and is directed by its own energy or a pump through the gas supply conduit 32 into the gas header 42 and into the thawing deck tubes 46. The gas header 42 distributes the thawing gas into the plurality of thawing tubes 46, which heats the thawing tubes 46 as heat is transferred from the gas to the lower-temperature tubes 46. Heat from the tubes in turn transfers to the frozen block of food product seated on the deck 40, leading to the thawing of the frozen food product. As heat is transferred from the gas to the tubes, the gas condenses into its liquid form and falls to the floor of each of the tubes 46. This condensed liquid is then drained by the draining lines 48, of which there may be one, two, or any number, from the gas header 42 to the liquid condensate header 44, and then through the condensate return conduit 34 into the tank 22.

Figure 1A:
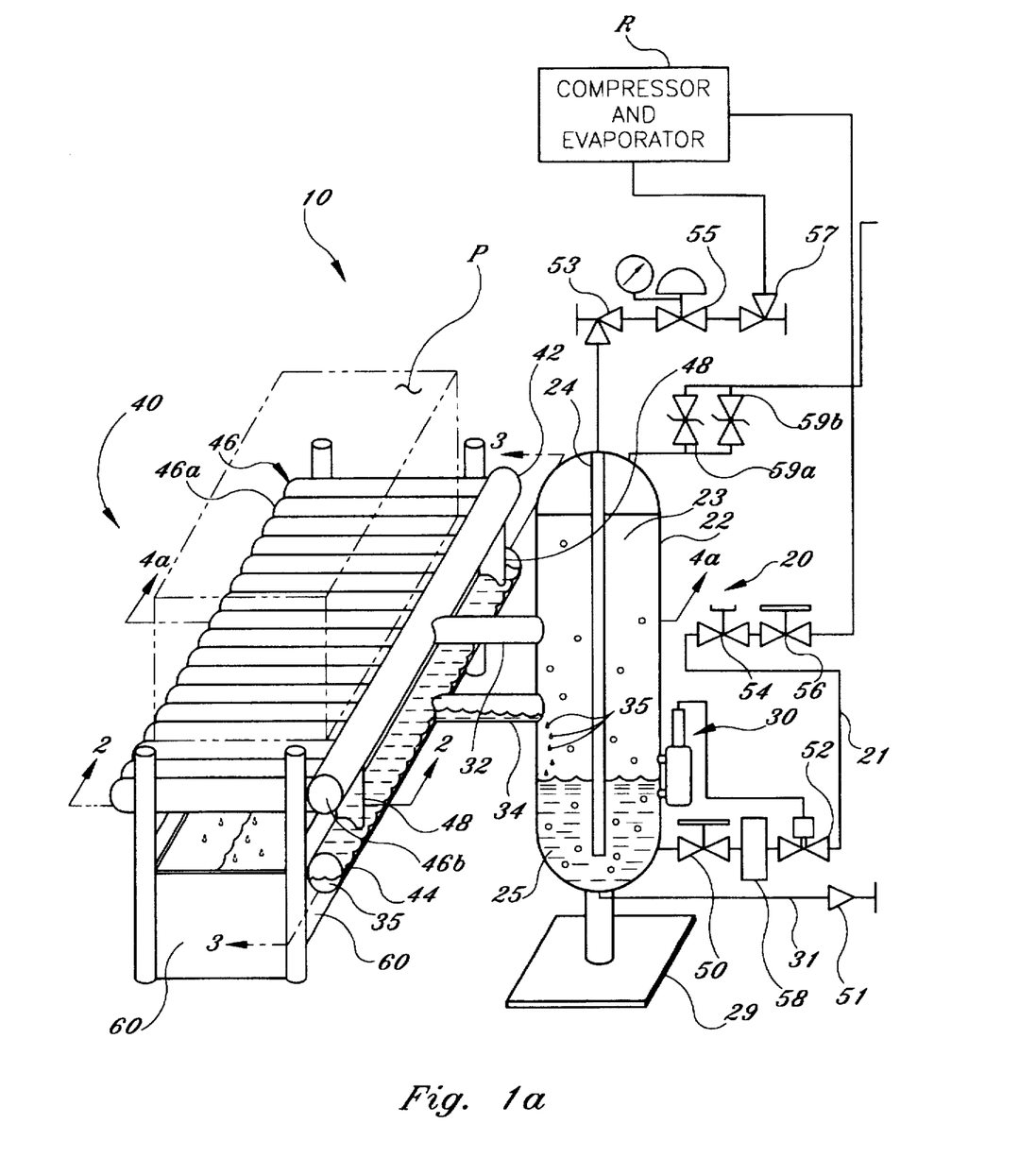
FIG. 1a is a pictorial representation of a first embodiment of the invention.
Figure 1B:
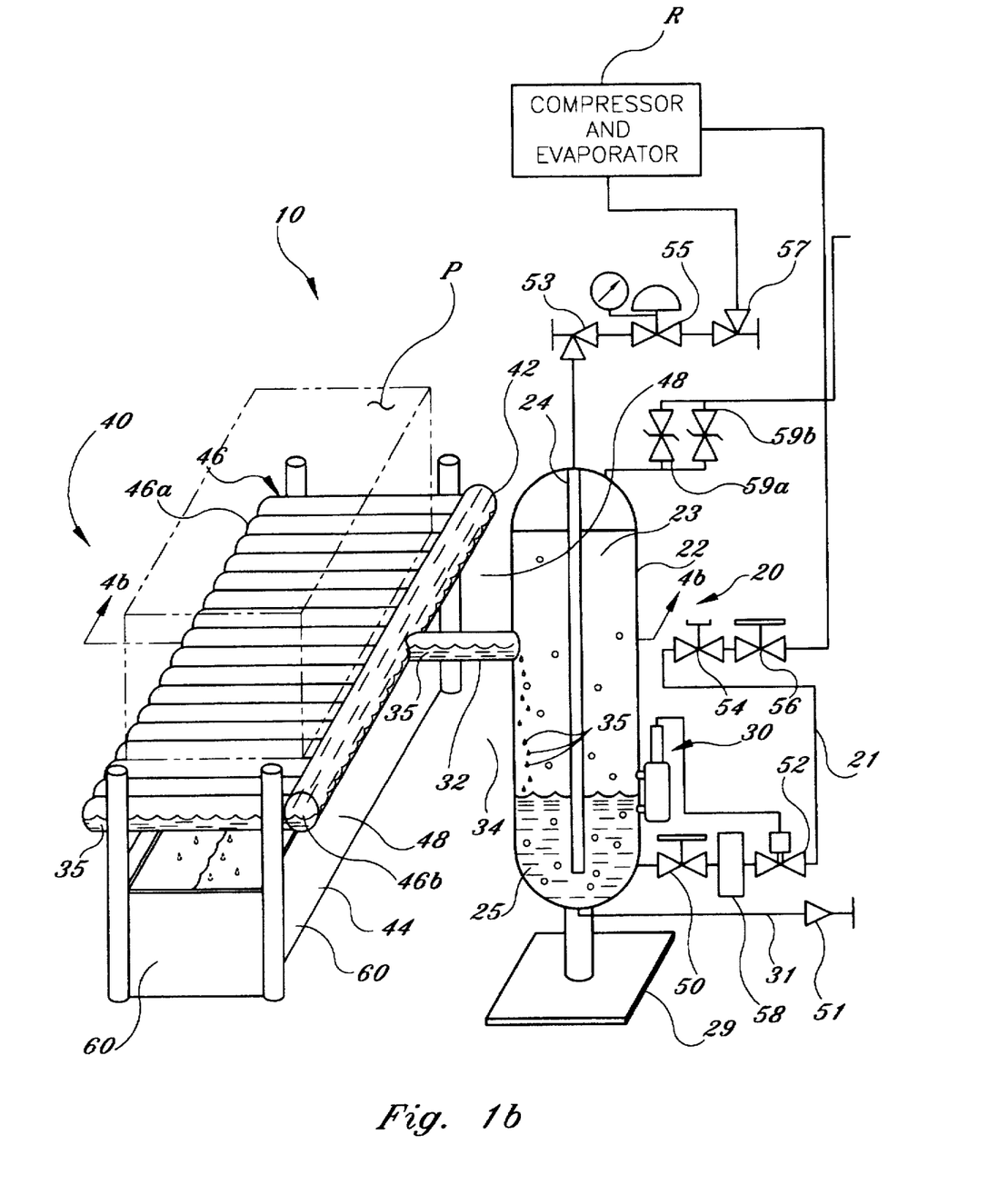
FIG. 1b is a pictorial representation of a first modified form of the first embodiment of the invention.

In the first embodiment, the apparatus for thawing comprises a gas supply system 20 that uses a direct heat exchanger 22, a thawing deck 40, a vapor supply conduit 32, a condensate return conduit 34, and a thawed food container 60. The gas supply system 20 includes a desuperheating tank 22, a quantity of thawing medium 25 in its liquid state, and a gas supply conduit 24. A stand or platform 29 may be included for supporting the tank 22. The desuperheating tank 22 defines a hollow interior cavity 23. Superheated thawing medium gas is supplied to the tank by the gas supply conduit 24 which is suspended within the tank and open at its bottom above the floor of the tank 22, as shown in FIG. 1A and 1B.

Figure 4A:
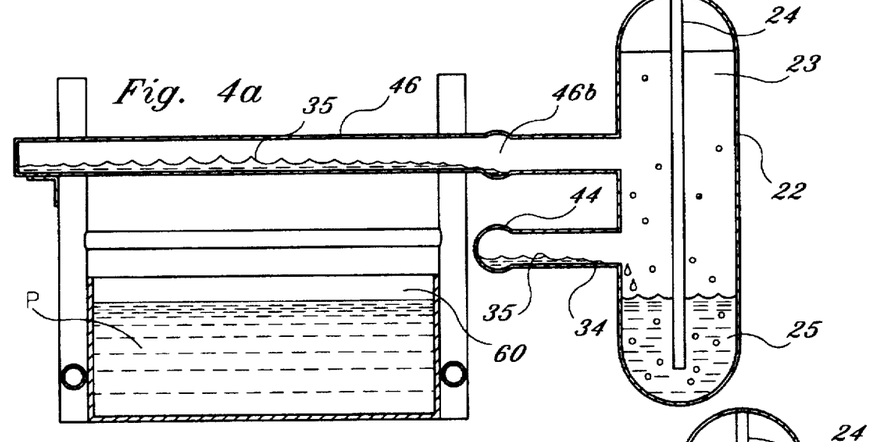
Figure 4B:
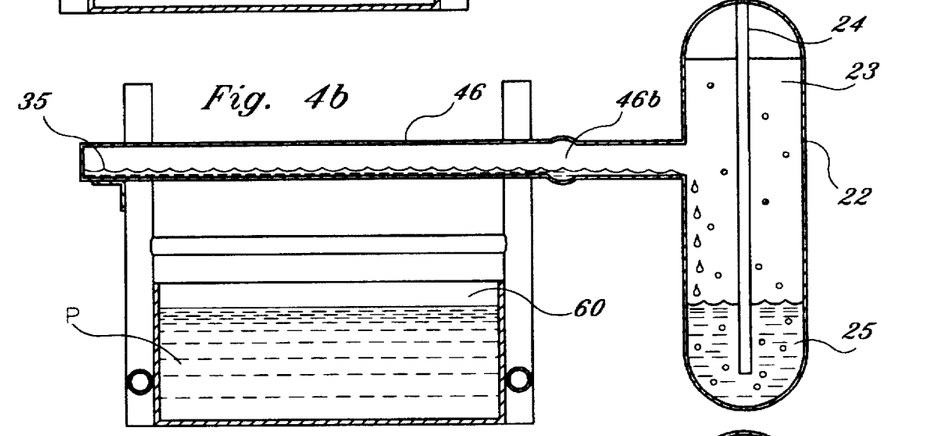
FIG. 4b is a cross sectional elevational view of the first modified form of the first embodiment of the invention, taken along lines 4b—4b of FIG. 1b.

The thawing deck 40 comprises a plurality of elongated thawing tubes 46 which are generally horizontally disposed to provide a near level support deck for the block of frozen food product P. However, it is to be understood that the tubes 46 may define a slightly non-horizontal plane such that the sliding of a frozen block onto the deck is facilitated, and runoff of condensed thawing medium from tubes 46 toward header 42 is also facilitated. The tubes 46 are spaced so as to allow passage for melted product to drop into container 60 below deck 40. The thawing tubes each have a closed end 46a and an open end 46b. The open ends of the tubes 46b are connected to or joined by the gas header 42 which directs thawing medium into the tubes 46. The closed ends 46a of the tubes 46 trap the thawing medium inside the tubes 46, allowing the gas to evenly distribute and transfer heat from one end of the tube to the other so that uniform heat transfer, and thus temperature, is maintained throughout the length of the tubes 46. A liquid-collecting header 44, shown in FIGS. 1a and 4a, is suspended below the vapor header 42 by hollow draining brackets 48 which drain condensed liquid collected in the vapor header 42 from the tubes 46 directly into the liquid-collecting header 44. As seen in FIG. 1b, however, the liquid collecting header 44 and return lines 48 can be eliminated, such that header 42 acts as a gas supply and liquid return header.

The thawing deck 40 is suspended above the thawed food product collection container 60 so that food product may be captured as the frozen block is thawed. More than one thawing deck 40 may be used. Superheated thawing medium gas is supplied to the interior 23 of shell 22 through conduit 24. The gas bubbles through, and hence interacts with, the liquid thawing medium 25 such that the temperature of the gas is lowered, and a desuperheated, saturated, gas is produced in the interior 23 of tank 22 above liquid 25. The interior 23 of tank 22 is fluidly communicated with gas supply header 42 via gas supply line 32. The hollow interiors of tubes 46 are in turn fluidly communicated with header 42, such that saturated thawing medium from within the interior 23 of tank 22 flows into the interiors of tubes 46. As this happens, energy within the desuperheated thawing medium is transferred to the walls of tubes 46 because the frozen block of food product P is resting thereupon. Since the desuperheated gas is near its saturation point, it immediately condenses to liquid upon giving up its latent heat of condensation to the tubes 46, making way for additional desuperheated gas near its saturation point to give up heat and condense, and so forth. The condensate flows along the bottoms of tubes 46, into the bottom of header 42, and down into condensate return header 44 via return tubes 48. From there, the condensed thawing medium 35 flows into the interior 23 of tank 22 via condensate return line 24. In the modified example of the first inventive embodiment shown in FIGS. 1b, 4b the condensed liquid 25 flows along the bottoms of tubes 46, along the bottom of header 42, and through gas supply/return line 32', into tank 22.

Figure 1C:
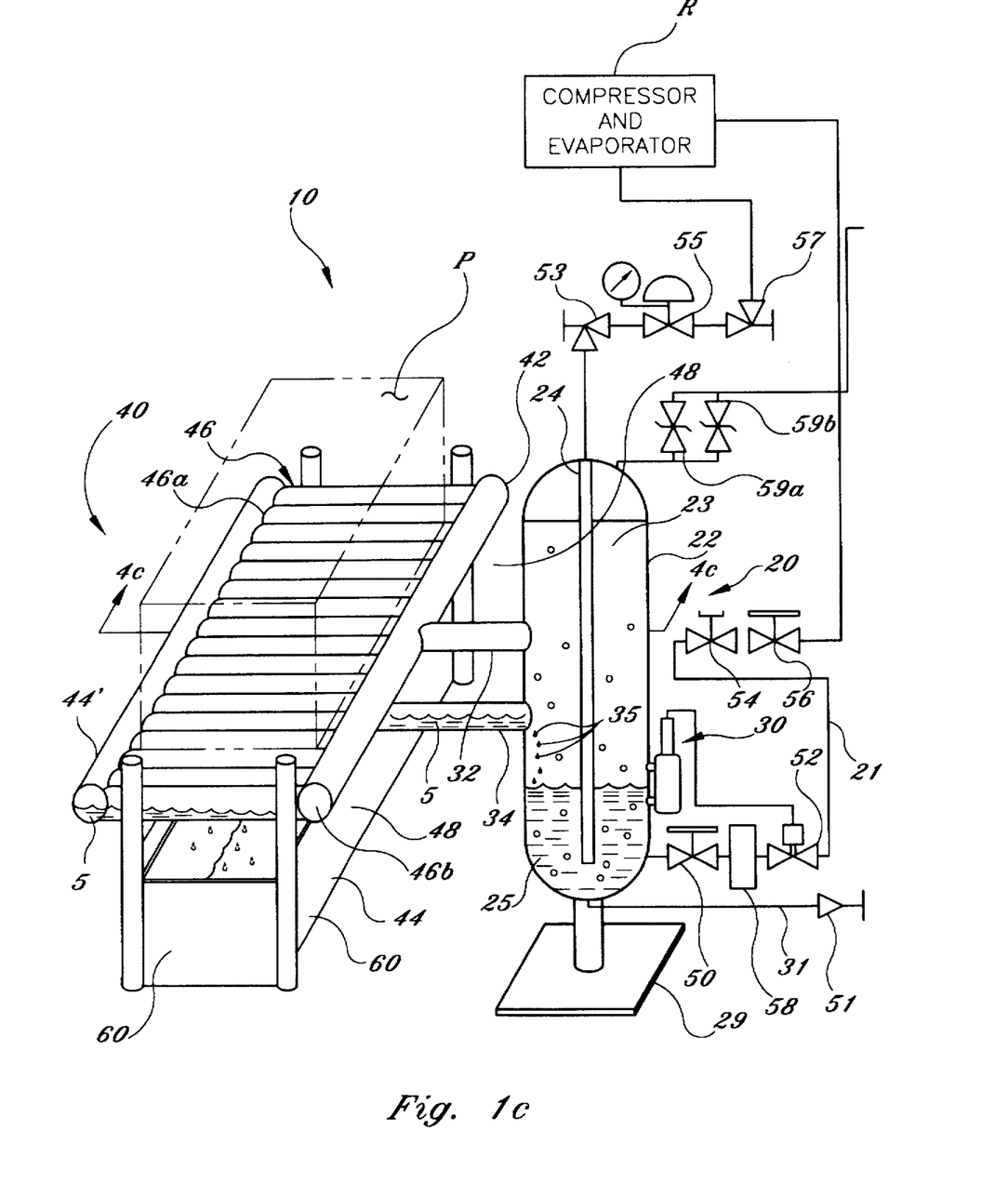
FIG. 1c is a pictorial representation of a second modified form of the first embodiment of the invention.
Figure 2:
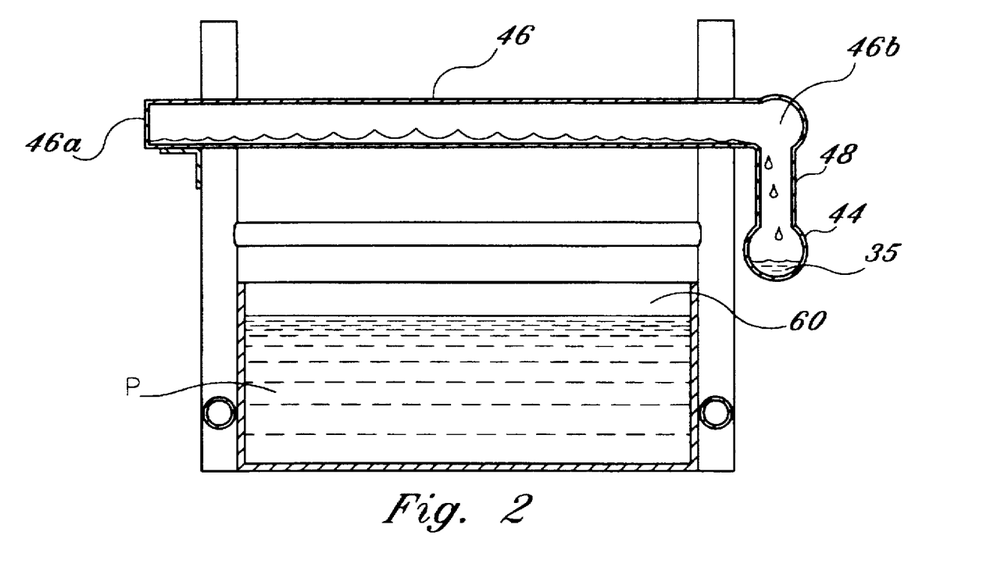
Figure 3:
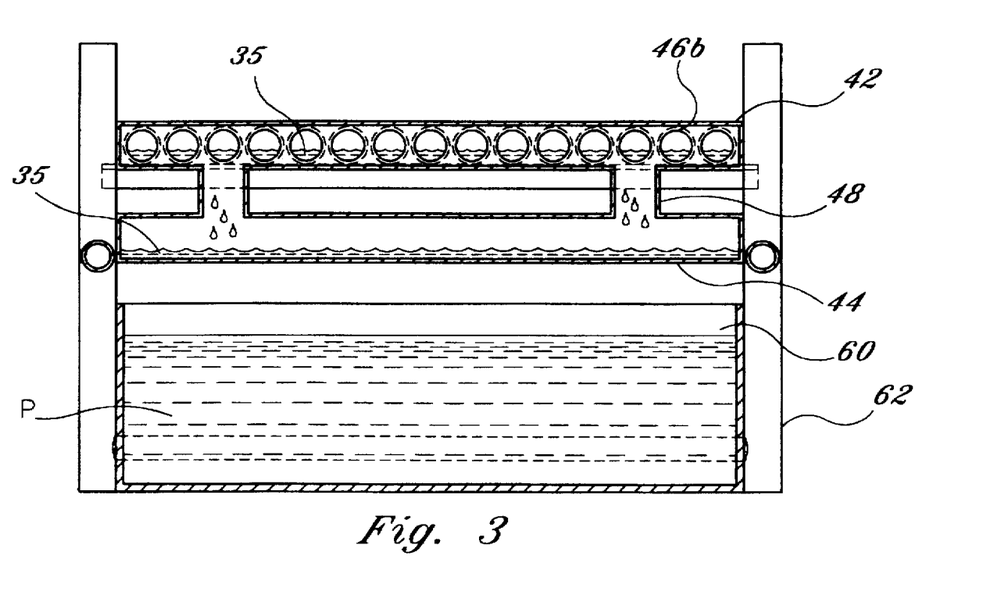
Figure 4C:
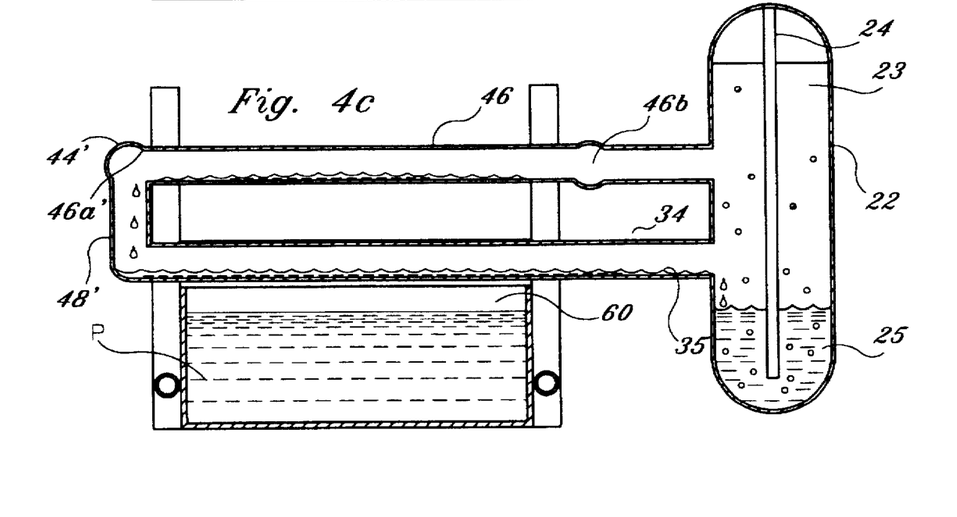
FIG. 4c is a cross sectional elevational view of the further modified form of the first embodiment of the invention, taken along lines 4c—4c of FIG. 1c.

A second modified form of the first embodiment of the invention is shown in FIGS. 1c and 4c, wherein condensate return header 44 is connected to the ends 46a of tubes 46, which are open, such that condensed (liquid) thawing medium 25 may run off from the interiors of tubes 46 and return to tank 22 via condensate return line 34.

As with all of the various embodiments which the instant invention may assume, the thawing deck tubes may be fluidly communicated with the source of thawing medium gas via any convenient means, and the condensed thawing medium may be returned to the refrigeration cycle such as the gas desuperheating tank 22 by any of the various known means.

In order to maintain the level of liquid thawing medium 25 in tank 22 below a predetermined level, a liquid level sensor and switch 30 and corresponding valves may be incorporated. The switch 30, which may be a float-type switch, is electrically coupled to an electric solenoid valve 52 which opens and closes to control the liquid level within the tank 22. Shutoff valves 50, 56 are connected on the inlet and outlet sides of the valve 52, respectively, and must be opened to allow flow. A flow restricting member 54 is also connected in line to control the flow rate of draining liquid thawing medium 25. The liquid 25 triggers the switch 30 when it reaches a predetermined level, which in turn causes the valve 52 to open to drain liquid 25 from the tank 22 and back through the return lines 21 to the refrigeration system. When a sufficient amount of liquid 25 is drained from the tank 22, the switch 30 is again triggered to deactivate or close valve 52.

The liquid 25 alternatively may be drained from the tank 22 through a drainage line 31. A shutoff valve 51 is connected to the drain line 31 for manually draining the tank 22. Shutoff valves 50 and 56 may precede and succeed solenoid valve 52, respectively, for manually controlling the level of condensate liquid in the tank. In addition, a flow restricting valve 54 may be connected in line with valve 52 to regulate flow once valve 56 is opened.

Other gas flow control devices may be employed. For instance, a shutoff valve 53 may be connected in the gas supply line 24 to control flow there into. A pressure regulating valve 55 may also be connected in the gas supply line 24 to set pressure at a desired level, depending on the thawing medium used. An additional shutoff valve 57 may be connected upstream of the pressure regulating valve 55 to control all flow of gas into the system. Since pressurized gas is being contained in a closed system, safety relief valves 59a and 59b may be connected to the tank to release the thawing medium, which may be a refrigerant-type fluid, to the outdoors in emergency situations, such as in a fire or when the system is otherwise under excessive pressure. The safety relief valves 59a, 59b may be triggered automatically when pressure within the interior 23 of tank 22 reaches a predetermined value.

Figure 5:
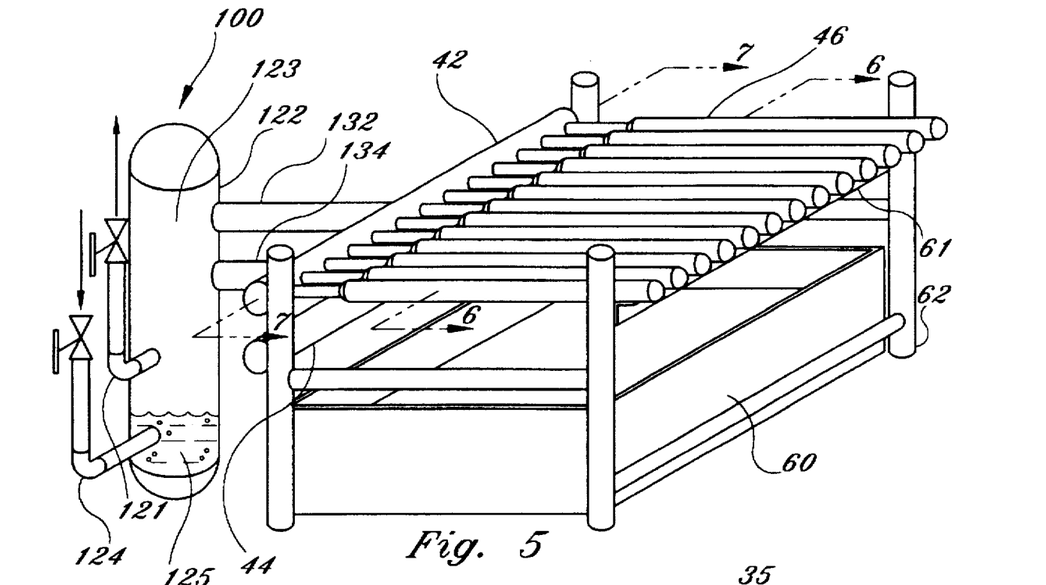
FIG. 5 is a pictorial representation of a second embodiment of the instant invention.
Figure 6:
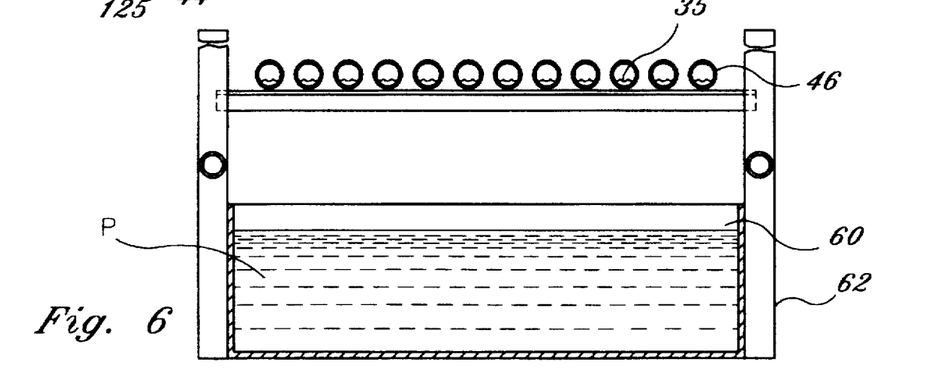
FIG. 6 is a cross sectional elevational view of the second embodiment, taken along lines 6—6 of FIG. 5.
Figure 7:
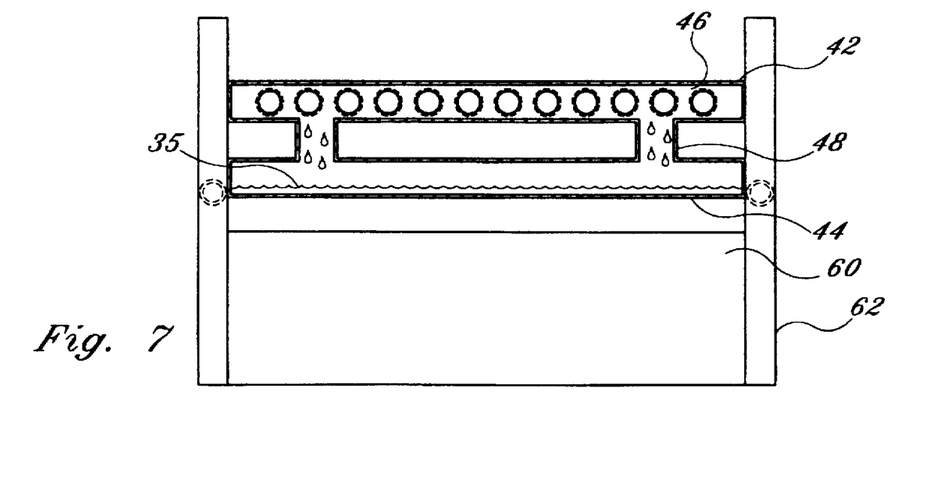
FIG. 7 is a cross sectional elevational view of the second embodiment, taken along lines 7—7 of FIG. 5.

In a second, simplified, embodiment, as shown in FIGS. 5-7, the apparatus comprises a desuperheating tank 122, a thawing deck 40 as described for FIGS. 1-4, a vapor supply conduit 132, a condensate return conduit 134, a gas supply line 124, a drainage line 121, and a thawed food product container or receptacle container 60. The desuperheating tank 122, having a condensation chamber 123, still operates as a direct heat exchanger in this embodiment, where a constant supply of saturated thawing gas is provided from the tank 122 to the thawing deck 40. The thawing deck 40 includes gas header 42 and liquid-collecting header 44 in communication with the thawing tubes 46. Alternatively, liquid header 44 and lines 48 may be eliminated so that header 42 acts as both a gas supply and condensate return header, as seen in FIG. 1b. Gas from tank 122 is supplied to the gas header 42 through gas supply conduit 132. Likewise, condensated thawing medium is drained from the thawing deck 40, into liquid-collecting header 44, through condensate return conduit 134 and back into the tank 122. In this embodiment, the level of condensate liquid 125 in the tank 122 is controlled manually through a drain line 121 which includes a valve 150 for allowing drainage of condensate liquid 125 from the tank. The valve 150 may be electrically actuated by a level switch as in the first embodiment, or controlled manually. The control of superheated thawing medium (gas) into the tank 122 is effectuated by shutoff valve 153 which is located in gas supply line 124. The gas supply line 124 feeds superheated gas into the condensed thawing medium 125, and the gas is then bubbled through the liquid, causing the gas to become desuperheated near its saturation point.

The thawing medium used in these systems may be ammonia, water, carbon dioxide, freon, sulphur dioxide, propane, or other gases susceptible of evaporation and condensation within conventional temperature and pressure ranges.

Figure 8:
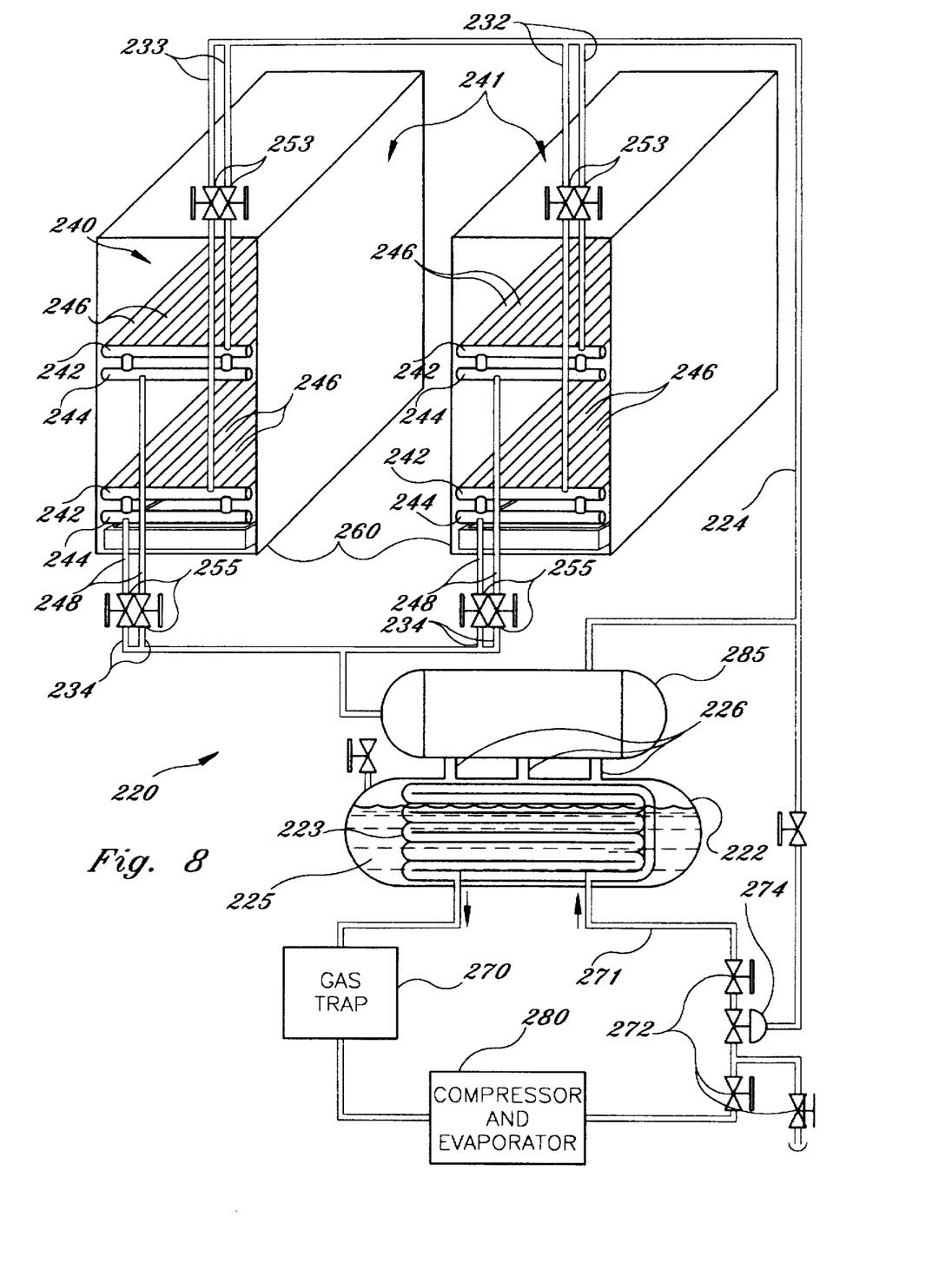
FIG. 8 is a pictorial representation of a third embodiment of the invention.

In a third embodiment, shown in FIG. 8, the apparatus comprises a gas supply system 220, at least one thawing deck 240, a vapor supply header 224, vapor supply lines 232, at least one thawing chamber 241, condensate liquid return lines 234, and at least one thawed food collection container 260. In this embodiment, at least one thawing chamber 241 housing at least one thawing deck 240 may be used, or multiple decks may be employed and heated by a common supply of saturated gas from gas supply system 220. System 220 comprises an indirect shell and tube type heat exchanger 223 having a shell volume or tank 222 for housing condensate or liquid thawing medium 225 and a tube volume or tubes 223, and a gas collecting chamber or phase separator 285 for separating saturated gas phase thawing medium produced in the tank 222 from the liquid thawing medium 225 therein. Vapor generated in the tank 222 flows up the vapor supply lines 226 into the phase separator 285. The phase separator 285 allows temporary reduction in the flow rate of the thawing medium vapor so that any liquid will drop out due to gravity, leaving only saturated gas to flow to decks 40 via gas supply lines 224, 232, and 233. The diameter of the vapor supply lines 226 should be large enough to allow liquid thawing medium carried upwardly by the rising vapor to drain back into the desuperheating tank. The heat exchanger 223 may simply include tubes housing electrical coils which produce heat by running current through the coils. Alternatively, the heat exchanger 223 may comprise tubes which are filled with a heating medium, such as ammonia, freon, water vapor, carbon dioxide, sulphur dioxide, or propane. In a separate closed loop system, the heating medium is directed through a supply line 271 into the tube heat exchanger 223 where it gives off heat to the tubes 223. The cooled heating medium drains from the heat tubes 223 into a gas trap system 270, as shown in FIG. 8, and through an evaporator and compressor system 280 where it is heated for recirculation through the heat exchanger tubes 223. The gas trap 270 is a high temperature suction system that removes any gas from the heating medium liquid condensate, only allowing the liquid condensate remaining to be passed on to the compressor system 280. This separate system for heating the tube heat exchanger 223 includes a plurality of shutoff valves 272 and a pressure-operated regulating valve 274, as in the embodiment shown in FIG. 1 and illustrated here in FIG. 5.

It is to be appreciated that the gas supply system 220 may utilize, in lieu of the apparatus set forth in the previous paragraph, a direct heat exchange apparatus such as tank 22 and thawing medium gas supply line 24. Alternatively, any other apparatus capable of supplying saturated gas thawing medium to decks 240 are contemplated.

The phase separator 285 includes an apparatus for removing any remaining liquid from the separator for feeding it back into the shell to be transformed back into a vapor. A shutoff valve 253 is connected in each of the gas supply lines 232 and 233 to control the supply of thawing medium going into the thawing decks 240. Each of the thawing decks includes a gas header 242 for receiving and distributing thawing medium to the thawing tubes 246 and a condensate liquid-collecting header 244 disposed below the vapor header 242 for collecting liquid condensate deposited on the floor of thawing tubes 246 as a result of heat transfer from the vapor. Again, the thawing tubes 246 have a closed end for containing the thawing medium inside the tubes to uniformly heat the tubes from one end to the other so that an even temperature is maintained throughout the length of the tubes for evenly thawing a frozen block deposited thereon. Drainage lines 248 suspend the liquid-collecting headers 244 below the gas supply headers 242 for receiving liquid condensate drained from the thawing tubes 246. Shutoff valves 255 may also be connected in each of the condensate return lines 234 for manually controlling the drainage of liquid condensate from the thawing decks 240.

The liquid return headers 244 and lines 248 may be eliminated as discussed above, in favor of utilizing headers 242 as both saturated gas supply headers and liquid condensate return headers. Or, the deck 4d/header 44' embodiment shown in FIGS. 1c and 4c may be employed.

Thawing is carried out as to all embodiments described herein in the manner set forth in connection with the first embodiment above. As an example, orange juice can be used as the food product. It is desirable to maintain the temperature of the juice at 40° F. or less. Therefore, if ammonia at 40° F. is used as the thawing medium, the pressure of the thawing medium in the gas supply lines 224, 232, and 233, headers 242 and 244, and deck tubes 246 is approximately 74 psi. It is to be noted that, for food product to be consumed by humans, the temperature of the thawing medium should range between 35° F. and 90° F. Other temperatures may be suitable for food products intended for consumption by animals. Further, the thawing process may be used as the first step in heating the food product to initiate pasteurization.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An apparatus for thawing frozen food product using the heat of condensing associated with a supply of saturated gas from a vapor compression refrigeration cycle, said apparatus comprising:

a plurality of thawing tubes generally horizontally arranged for supporting and thawing a block of frozen food product;

a supply of saturated gas thawing medium from said vapor compression refrigeration cycle fluidly communicating with interiors of said thawing tubes, said saturated gas thawing medium transferring heat through said thawing tubes to said food product and thereby condensing;

means for draining condensed thawing medium from said thawing tubes;

means for receiving thawed food product.

2. The apparatus for thawing frozen food product as recited in claim 1, further comprising a gas supply header fluidly communicating said source of thawing medium with said interiors of said thawing tubes, and a condensate return header fluidly communicating said interiors of said thawing tubes with a means for receiving condensed thawing medium.

3. The apparatus for thawing frozen food product as recited in claim 2, wherein said source of thawing medium includes a supply of superheated thawing medium, and a means for desuperheating said superheated thawing medium, said means for desuperheating fluidly communicating with said gas supply header.

4. The apparatus for thawing frozen food product as recited in claim 3, wherein said means for receiving condensed thawing medium and said means for desuperheating said superheated thawing medium are the same.

5. The apparatus for thawing frozen food product as recited in claim 4, further comprising a means for maintaining a predetermined level of condensed thawing medium in said means for desuperheating said superheated thawing medium.

6. A method for thawing frozen blocks of food product using the heat of condensing from a vapor compression refrigeration cycle, said method comprising the steps of:

supporting at least one frozen block of food product on a generally horizontal heat transfer thawing deck, said heat transfer thawing deck having a heat transfer surface in thermal communication with a heat transfer chamber;

supplying a thawing medium in the form of a saturated gas from said vapor compression refrigeration cycle to said heat transfer chamber;

allowing said saturated gas thawing medium to condense upon said heat transfer surface giving up its latent heat of condensation to said food product through said heat transfer surface;

removing condensed thawing medium from said heat transfer chamber; and catching thawed food product in a means for receiving said thawed food product.

7. The method of claim 6, wherein said step of removing condensed thawing medium is carried out by providing a floor of said heat transfer chamber opposite said heat transfer wall means at an orientation other than parallel to horizontal so that said condensate will flow out of said heat transfer chamber due to gravity.

8. The method of claim 6, wherein said thawing medium in the form of a saturated gas is provided by desuperheating a supply of superheated thawing medium in a means for desuperheating said thawing medium.

9. An apparatus for thawing frozen food product using the heat of condensing associated with a supply of saturated gas from a vapor compression refrigeration cycle, said apparatus comprising:

a superheated gas desuperheating means in fluid communication with a supply of superheated gas from a vapor compression refrigeration cycle, said desuperheating means for removing superheat from said superheated gas thereby yielding a supply of saturated gas thawing medium;

a plurality of thawing tubes in fluid communication with said saturated gas thawing medium, said plurality of thawing tubes being generally horizontally arranged for supporting and thawing a block of frozen food product, whereby said saturated gas thawing medium transfers heat to said block of frozen food product, through said thawing tubes, thereby condensing into liquid;

a condensed liquid header in fluid communication with each of said plurality of thawing tubes for returning said condensed liquid for recirculation in said vapor compression refrigeration cycle; and means for receiving thawed food product.

10. An apparatus for thawing frozen food product according to claim 9, wherein said desuperheating means comprises a tank having a predetermined level of liquid thawing medium maintained therein, said source of superheated gas communicating with said desuperheating means at a submerged location, said superheated gas is discharged into said liquid thawing medium, whereby heat is transferred from said superheated gas to said liquid such that desuperheated gas emerges above said liquid.

11. A method of using an apparatus for thawing frozen food product using the heat of condensing associated with a supply of gas from a vapor compression refrigeration cycle, said method comprising the steps of:

fluidly connecting an apparatus for thawing frozen food product to a vapor compression refrigeration cycle;

supporting at least one frozen block of food product on a generally horizontal heat transfer thawing deck, said heat transfer thawing deck having a heat transfer surface in thermal communication with a heat transfer chamber;

supplying a thawing medium in the form of a saturated gas from said vapor compression refrigeration cycle to said heat transfer chamber;

allowing said saturated gas thawing medium to condense upon said heat transfer surface giving up its latent heat of condensation to said food product through said heat transfer surface;

removing condensed thawing medium from said heat transfer chamber; and catching thawed food product in a means for receiving said thawed food product.

12. A method according to claim 11 wherein the step of supplying a thawing medium in the form of a saturated gas from said vapor compression refrigeration cycle to said heat transfer chamber includes desuperheating a supply of superheated gas to remove substantially all of the superheat associated with said superheated gas thereby yielding said supply of saturated gas.

* * * * *